United States Patent
Takami et al.

(10) Patent No.: US 10,215,257 B2
(45) Date of Patent: Feb. 26, 2019

(54) SHORT RUBBER REINFORCEMENT FIBER, RUBBER COMPOSITION CONTAINING SAID SHORT FIBER, AND POWER TRANSMISSION BELT

(71) Applicant: ASAHI KASEI KABUSHIKI KAISHA, Kanda Jinbocho, Chiyoda-ku, Tokyo (JP)

(72) Inventors: Yuki Takami, Tokyo (JP); Fumiaki Ise, Tokyo (JP); Hiroo Kawahara, Tokyo (JP); Hirofumi Enokizono, Tokyo (JP); Tatsuya Sawairi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 15/302,727

(22) PCT Filed: Apr. 9, 2015

(86) PCT No.: PCT/JP2015/061115
§ 371 (c)(1),
(2) Date: Dec. 30, 2016

(87) PCT Pub. No.: WO2015/159795
PCT Pub. Date: Oct. 22, 2015

(65) Prior Publication Data
US 2017/0037933 A1    Feb. 9, 2017

(30) Foreign Application Priority Data

Apr. 17, 2014 (JP) .................................. 2014-085678

(51) Int. Cl.
*F16G 5/20* (2006.01)
*C08L 77/06* (2006.01)
(Continued)

(52) U.S. Cl.
CPC ............ *F16G 5/20* (2013.01); *B29D 99/0078* (2013.01); *C08K 7/02* (2013.01); *C08L 77/06* (2013.01);
(Continued)

(58) Field of Classification Search
CPC ......... B29B 15/125; B29B 15/08; B29B 9/14; D01G 1/04; F16G 1/08; F16G 5/06;
(Continued)

(56) References Cited

U.S. PATENT DOCUMENTS 4,491,657 A * 1/1985 Saito .................... D01F 6/62
264/210.8
5,217,801 A  6/1993 Hamada
(Continued)

FOREIGN PATENT DOCUMENTS

EP  0 466 346    1/1992
EP  0 686 714   12/1995
(Continued)

OTHER PUBLICATIONS

Supplementary European Search Report for corresponding EP Application No. 1578043.6 dated Mar. 29, 2017.
(Continued)

*Primary Examiner* — Camie S Thompson
(74) *Attorney, Agent, or Firm* — Finnegan, Henderson, Farabow, Garrett & Dunner, LLP

(57) ABSTRACT

Provided is a short rubber reinforcement fiber for short fiber-containing rubber compositions that are used for transmission belts for which friction transmission behavior has been stabilized and travel service life has been further improved. The present invention is a short fiber, which is the product of cutting an adhesive-treated synthetic long fiber multifilament yarn and is used by dispersing in a rubber composition, the short fiber being characterized in that the (Continued)

percentage of the number of non-adhesive-treated single yarns is 0-5%; and a method for manufacturing said short fibers, the method comprising a step for immersing a sudare-woven product in which the synthetic long fiber multifilament yarns have been sudare-woven in an adhesive treatment solution and then pressing at a nip pressure of 1.2-5.0 MPa using nip rolls, and a step for cutting the sudare-woven product bundles obtained to a specified length.

17 Claims, 3 Drawing Sheets

(51) Int. Cl.
| | |
|---|---|
| *B29D 99/00* | (2010.01) |
| *F16G 1/10* | (2006.01) |
| *F16G 5/08* | (2006.01) |
| *C08K 7/02* | (2006.01) |
| *D06M 15/41* | (2006.01) |
| *D06M 15/693* | (2006.01) |
| *F16G 1/08* | (2006.01) |
| *F16G 5/06* | (2006.01) |
| *D01G 1/04* | (2006.01) |
| *B29B 15/12* | (2006.01) |
| *D06M 101/34* | (2006.01) |

(52) U.S. Cl.
CPC .............. *D01G 1/04* (2013.01); *D06M 15/41* (2013.01); *D06M 15/693* (2013.01); *F16G 1/08* (2013.01); *F16G 1/10* (2013.01); *F16G 5/06* (2013.01); *F16G 5/08* (2013.01); *B29B 15/125* (2013.01); *D06M 2101/34* (2013.01)

(58) Field of Classification Search
CPC . F16G 5/20; F16G 5/08; D06M 15/41; B29D 99/0078; B29D 99/00; C08K 7/02; C08L 77/06; B60C 9/0042; C08J 5/06
USPC .............................................. 428/296.4, 493
See application file for complete search history.

(56) References Cited

U.S. PATENT DOCUMENTS

| | | | |
|---|---|---|---|
| 5,624,515 A * | 4/1997 | Onoe | B29B 9/14 |
| | | | 156/137 |
| 5,624,525 A | 4/1997 | Onoe et al. | |
| 6,503,623 B1 * | 1/2003 | Oue | D01F 6/62 |
| | | | 428/364 |
| 2007/0197688 A1 | 8/2007 | Tsukada et al. | |

FOREIGN PATENT DOCUMENTS

| | | |
|---|---|---|
| JP | H3-287827 A | 12/1991 |
| JP | H4-053836 A | 2/1992 |
| JP | H7-118920 A | 5/1995 |
| JP | H7-268771 | 10/1995 |
| JP | H8-53552 A | 2/1996 |
| JP | H8-239484 | 9/1996 |
| JP | H10-103414 A | 4/1998 |
| JP | H11-1577 | 1/1999 |
| JP | 2000-199181 A | 7/2000 |
| JP | 2004-211755 A | 7/2004 |
| JP | 2009-013512 A | 1/2009 |
| JP | 2012-214659 A | 11/2012 |
| JP | 2013-010909 A | 1/2013 |
| JP | 2014-189931 A | 10/2014 |
| WO | WO 2005/092971 | 10/2005 |

OTHER PUBLICATIONS

International Search Report and Written Opinion of the International Searching Authority, dated Jul. 14, 2015, in corresponding International Application No. PCT/JP2015/061115; 9 pages.

* cited by examiner

SHORT RUBBER REINFORCEMENT FIBER, RUBBER COMPOSITION CONTAINING SAID SHORT FIBER, AND POWER TRANSMISSION BELT

TECHNICAL FIELD

The present invention relates to staple fibers (hereinafter also referred to as short fibers) for reinforcing a power transmission belt, a method for producing the same, a rubber composition containing that staple fibers, and a power transmission belt. More particularly, the present invention relates to short reinforcement fibers added to the rubber friction transmission portion of a power transmission belt such as a V-ribbed belt or raw edge belt, the short reinforcement fibers being staple fibers for reinforcing a power transmission belt that demonstrates superior dispersibility in the rubber, stabilize friction transmission behavior of the belt, and further improve travel service life, as well as a method for producing those staple fibers, and a rubber composition containing those staple fibers.

BACKGROUND ART

In recent years, there is a growing demand for rubber products that are capable of withstanding harsh usage environments accompanying the higher levels of function and performance in the rubber industry, and particularly automobile parts. Although the properties of rubber products are determined by such factors as selection of the raw material rubber or the combination of compounding agents used, more recently, staple fibers have come to be routinely incorporated for the purpose of improving reinforcability and abrasion resistance.

As shown in FIG. 6, a type of power transmission belt in the form of a V-ribbed belt 10 has core wires 12 embedded in a cushioning rubber layer 14, a covering canvas 15 as necessary above the cushioning rubber layer, and a plurality of ribs 17 and 18 serving as friction transmission portions provided below the cushioning rubber layer 14, and in comparison with other V-belts, demonstrates superior power transmittability corresponding to the increase in contact surface area with a pulley attributable to the presence of the V-shaped ribs, V-ribbed belts are taking the place of V-belts in power transmission applications involving driving of accessories such as automobile air compressors or alternators, and more recently, in addition to the reduced size of engine rooms and reductions in pulley diameter accompanying reduced engine weight, are being applied in accommodation of serpentine drive systems that are driven by suspending belts between a plurality of pulleys arranged so as to wind through the engine room.

In addition, since V-ribbed belts allow the obtaining of high output as a result of having ample bending fatigue resistance due to their shape, they are used at a high initial tension setting since they are used with small diameter pulleys and rotate at high speeds. Recently, the Freon conventionally used in air compressors has been changed to the use of Freon substitutes in consideration of problems associated with environmental destruction. Consequently, it becomes necessary to enhance compressive force in order to cool to the same temperature in comparison with conventional Freon, thereby increasing the torque generated when operating the air compressor and forcing V-ribbed belts to withstand even higher loads.

In the case of this type of belt, power transmission belts have been proposed that enhance lateral pressure resistance of friction transmission portions of the belt by embedding a short fiber assembly in the ribs while maintaining orientation in the direction of belt width, and as a result of further intentionally exposing a portion of the embedded staple fibers from the lateral surface of the belt, friction performance and tackiness of the ribs are controlled with the aim of demonstrating the effect of inhibiting sound generated during belt slippage.

However, in the case of using a rubber composition in which staple fibers have been dispersed in a power transmission belt that is repeated subjected to compressive force, dispersibility of the staple fibers becomes poor resulting in the formation of clumps, and those portions where clumps form become the starting points of cracks, thereby causing belt malfunctions and further shortening the travel service life of the belt.

Moreover, in the case of increasing the number of staple fibers exposed on the belt lateral surface and setting a lower apparent dynamic friction coefficient between the rib rubber and pulley V groove in order to inhibit the generation of abnormal noises during belt slippage, there was the problem of it requiring time until the effect of the staple fibers was eliminated since, following the occurrence of belt slippage, the number of exposed short fibers continues to decrease due to the staple fibers becoming worn, coming out or being cut off. In other words, a longer amount of time until the apparent dynamic friction coefficient between the surfaces of the rubber ribs and pulley V groove increases and becomes stable, and depending on the case, may result in the problem of slippage continuing to the point the belt ruptures due to generation of heat on the surface where slippage occurs.

Patent Documents 1 and 2 indicated below disclose methods for producing a master batch in which staple fibers are dispersed in rubber followed by ultimately incorporating in a rubber composition for the purpose of improving the dispersibility of staple fibers in rubber. However, a softening agent and plasticizer for promoting dispersion are required when producing the master batch, which in addition to increasing the levels of time and labor required to produce the master batch, also result in the problem of the need for additives not directly related to the rubber composition with respect to basic function.

In addition, although Patent Document 3 indicated below discloses an adhesive treatment method consisting of subjecting the staple fibers used to adhesive treatment (such as resorcinol-formaldehyde-latex (RFL) treatment) followed by incorporating in a rubber composition, in this method, the formula of the adhesive used is changed to increase the amount of latex component having high affinity for rubber. However, since the formula of the adhesive is designed with the focus on adhesion, there were limitations on the degree to which dispersibility is improved.

In addition, Patent Document 4 indicated below discloses a method for obtaining staple fibers by forming cotton fibers and the like into the shape of untwisted slivers and then subjecting to RFL treatment and cutting. Although the resulting staple fibers have improved rubber dispersibility, since they are not the result of cutting long fibers, their fiber length and diameter are uneven. In this case, there is the problem of the incorporation of these staple fibers into rubber lowering the effect of being able to control orientation and abrasion resistance of the rubber.

Moreover, Patent Document 5 indicated below discloses a method for obtaining staple fibers by loosely twisting multifilament yarn to form a bamboo reed woven fabric followed by subjecting to adhesive treatment and cutting into staple fibers. However, adhesion uniformity of the adhesive was still not satisfactory and clumps of staple fibers having adhesive adhered thereto became surrounded by staple fibers not having adhesive adhered thereto, thereby preventing this method from solving the problem of the formation of aggregates (lumps). The presence of these lumps inhibited kneading during rubber incorporation resulting in the problem of uneven incorporation of staple fibers. In addition, in the case of these lumps being incorporated in rubber, they form fiber assemblies within the rubber resulting in the problem of creating locations where stress concentrates. Moreover, there was also the problem of staple fibers not having adhesive adhered thereto becoming exposed on the belt surface in the form of staple fibers not completely adhered to the rubber.

PRIOR ART DOCUMENTS

Patent Documents

Patent Document 1: Japanese Unexamined Patent Publication (Kokai) No. H8-239484
Patent Document International Publication No. WO 2005/092971
Patent Document 3: Japanese Unexamined Patent Publication (Kokai) No. H11-1577
Patent Document 4: Japanese Unexamined Patent Publication (Kokai) No. 2000-199181
Patent Document 5: Japanese Unexamined Patent Publication (Kokai) No. H8-53552

SUMMARY OF THE INVENTION

Problems to be Solved by the Invention

With the foregoing in view, an object of the present invention is to provide short rubber reinforcement fibers for a power transmission belt having stabilized friction transmission behavior and further improved travel service life, and for a rubber composition containing staple fibers.

Means for Solving the Problems

As a result of conducting extensive research and experimentation to solve the aforementioned problems, the inventors of the present invention found that, by incorporating staple fibers having an adhesive uniformly adhered thereto into a rubber composition, a power transmission belt is obtained in which friction transmission behavior is stabilized and travel service life is further improved, thereby leading to completion of the present invention.

Namely, the present invention is as indicated below.

[1] Staple (short) fibers, which are the product of cutting an adhesive-treated synthetic (long fiber) multifilament yarn, and are used by dispersing in a rubber composition; wherein, the ratio of the number of non-adhesive-treated single filaments is 0% to 50%.
[2] The staple fibers described in [1] above, wherein the adhesive is adhered to the staple fibers at 1.0% by weight to 5.0% by weight.
[3] The staple fibers described in [1] or [2] above, wherein the single filament fineness is 1 dtex to 8 dtex.
[4] The staple fibers described in any of [1] to [3] above, wherein the length of the staple fibers is 0.5 mm to 8 mm.
[5] The staple fibers described in [4] above, wherein the length of the staple fibers is 0.5 mm to 5 mm.
[6] The staple fibers described in any of [1] to [5] above, wherein the oblateness of a cross-section of the synthetic multifilament yarn is 2.0 to 4.0.
[7] The staple fibers described in any of [1] to [6] above, wherein the fineness of a cross-section of the synthetic multifilament yarn is 400 dtex to 8,000 dtex.
[8] The staple fibers described in any of [1] to [7] above, wherein the birefringence of the synthetic multifilament yarn is 0.050 or more.
[9] A method for manufacturing the staple fibers described in any of [1] to [8] above, comprising the following steps:
a step for immersing a woven tire fabric, obtained by weaving a synthetic multifilament yarn in the manner of a tire fabric, in an adhesive treatment solution followed by pressing with nip rolls at a nip pressure of 1.2 MPa to 5.0 MPa, and
a step for cutting bundles of the resulting tire fabric to a prescribed length.
[10] The method described in [9] above, wherein twisting of the synthetic multifilament yarn of the tire fabric is 9 twists/10 cm or less.
[11] The method described in [9] or [10], wherein the cover factor of warp yarn of the tire fabric (√(warp yarn total fineness (dtex))×warp yarn density (yarns/cm)) is 150 to 2000.
[12] The method described in [11] above, wherein the cover factor of warp yarn of the tire fabric (√(warp yarn total fineness (dtex))×warp yarn density (yarns/cm)) is 500 to 2000.
[13] The method described in any of [9] to [12] above, wherein the weave structure of the tire fabric is n/1 wherein n is an integer of 1 to 3.
[14] The method described in any of [9] to [13] above, wherein weft yarn density of the tire fabric is 0.5 yarns/5 cm to 5 yarns/5 cm.
[15] A rubber composition containing the staple fibers described in any of [1] to [8] above or staple fibers manufactured according to the method described in any of [9] to [14] above.
[16] A power transmission belt composed of the rubber composition described in [15] above.

Effects of the Invention

The short rubber reinforcement fibers according to the present invention have an adhesive uniformly adhered thereto and uniformly disperse when incorporated in rubber, and in the case of having used to compose a power transmission belt, stabilize friction transmission behavior and improve travel service life.

EMBODIMENTS FOR CARRYING OUT THE INVENTION

Figure 1:
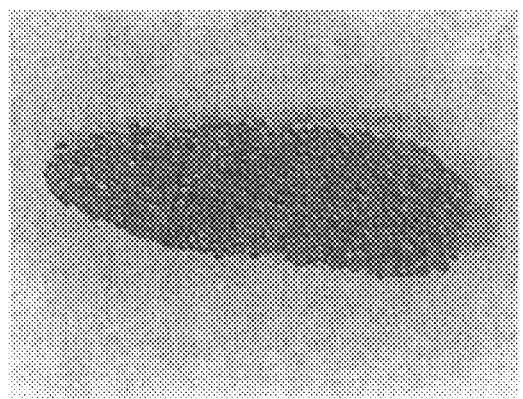
FIG. 1 is a photograph of a cross-section of a multifilament having staple fibers according to the present invention.
Figure 2:
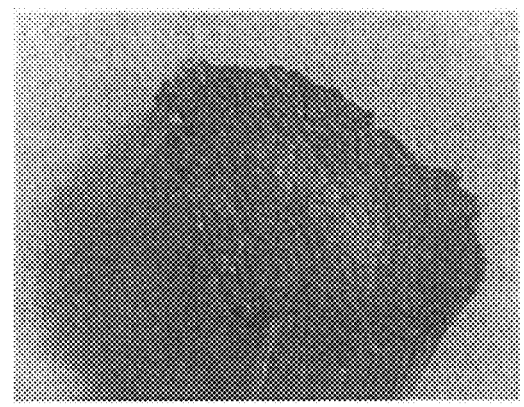
FIG. 2 is a photograph of a cross-section of a multifilament having staple fibers of the prior art.

The following provides a detailed explanation of embodiments of the present invention.

The short rubber reinforcement fibers of the present embodiment are short fibers that are incorporated by kneading into a rubber composition and reinforce and control properties of the rubber, and are obtained by subjecting a synthetic long fiber multifilament to adhesive treatment followed by cutting.

There are no particular limitations on the material of the synthetic filament (long fiber) of the present embodiment. The synthetic filament is preferably a polyamide-based synthetic fiber or polyester-based synthetic fiber, and is more preferably a polyamide-based synthetic fiber. Examples of polyamide-based synthetic fibers include aliphatic polyamide fibers and para-based aramid fibers (polyparaphenylene terephthalamide). Preferable examples of aliphatic polyamides include polyamide 66, polyamide 6, polyamide 6/10, polyamide 6/4, polyamide 11 and alicyclic polyamides falling within the scope of an aliphatic polyamide. Aliphatic polyamide fibers, including alicyclic polyamide fibers, are particularly preferable from the viewpoint of adhesion with rubber by means of an adhesive. Strong adhesive strength can be expected since the amide bond effectively interacts with the adhesive through hydrogen bonds, and the flexible molecular backbone of an aliphatic interacts in the amorphous region.

The synthetic multifilament of the present embodiment is filaments manufactured in a continuous spinning step, and is composed of bundles of single filaments. The fiber length of staple fibers can be made to be constant by cutting the long fiber to a constant length. Making the fiber length and fiber diameter of the staple fibers constant makes it possible to effectively take advantage of the staple fibers in anisotropic formation of rubber properties when orienting and incorporating in rubber.

Birefringence ($\Delta n$) of the synthetic multifilament of the present embodiment is preferably 0.050 or more. If birefringence is 0.050 or more, abrasion resistance is favorable, cross-sections of staple fibers protruding from the surface of the rubber are resistant to deformation and fluctuations in slip characteristics of the belt are inhibited when exposed to abrasion together with the rubber on a sliding surface formed after incorporating in rubber due to the high degree of orientation of polymer chains composing the filaments. In the case birefringence is low an orientation of polymer chains composing the filaments is low, the fiber cross-section is deformed during sliding, and since the area that contacts the sliding portion increases, slip ratio ends up increasing. The magnitude of this change increases particularly in a usage environment involving high-load driving. In a system that uses a power transmission belt, although transmittability is corrected by automatically controlling tension and the like, even in this case, energy loss increases, potentially resulting in an increase in the load shortening the service life of the belt. Birefringence is more preferably 0.055 or more. On the other hand, birefringence is preferably 0.180 or less. This makes possible to avoid adhesive being unable to permeate molecularly into a polymer of fibers having an excessively high degree of orientation, thereby resulting in the risk of a loss of chemical adhesive strength. Birefringence is more preferably 0.080 or less.

Adhesive treatment of the present embodiment consists of treatment for impregnating the aforementioned synthetic fibers with a resin for adhering the synthetic fibers and rubber, and an example of such treatment is resorcinol-formaldehyde-latex (RFL) treatment. Heat is applied in an adhesive treatment step, which allows the development of adhesive force between the fibers and adhesive while also resulting in thermal stabilization of the fibers per se.

The rubber reinforcement short fibers of the present embodiment are preferably obtained by cutting a multifilament of synthetic filaments into staple fibers following adhesive treatment.

The ratio of the number of non-adhesive-treated single filaments in the staple fibers of the present embodiment is 0% to 5%. In the prior art, portions remained within the filaments to which adhesive did not permeate despite having subjected a multifilament to adhesive treatment, and as a result, there was a mixture of single filaments to which adhesive had adhered and single filaments to which adhesive had not adhered in the cut staple fibers. In the present embodiment, the ratio of the number of non-adhesive-treated single filaments not having adhesive adhered thereto among all of the resulting staple fibers (blank filaments ratio) is 5% or less, preferably 3% or less and more preferably 2.5% or less.

The ratio of the number of non-adhesive-treated single fibers (blank filaments ratio) can be confirmed on a cross-section obtained by cutting the multifilament. Since many of the staple fibers remain solidified on the cross-section of the multifilament after cutting due to the adhesive, the degree of impregnation of the adhesive can be easily observed, thereby making it possible to determine the ratio of the number of non-adhesive-treated single fibers (blank filaments ratio). The portion along the outer periphery of the multifilament cross-section where the adhesive has permeated is observed as being colored, namely as black fiber, while the portion not permeated by adhesive in the center of the cross-section is observed as white yarn, thereby making it possible to roughly separate the multifilament into two types. If the adhesive had completely permeated the multifilament, the cross-section would only consist of a colored portion in the form of black fiber, and the ratio of the number of non-adhesive-treated fibers (blank filaments ratio) would be 0%.

In a photomicrograph, single fiber cross-sections of a cross-section of the multifilament are separated into individual single fiber cross-sections using a particle analysis technique, and the luminosity of each single fiber cross-section is determined to obtain a luminosity distribution. The ratio of the number of single fibers having high luminosity and classified as blank filaments among the number of single fibers of a cross-section can be obtained as the ratio of the number of non-adhesive treated fibers (blank filaments ratio). Furthermore, in the classification of blank filaments, single fiber cross-sections having luminosity that is 25% from the maximum luminosity within the range from maximum luminosity to minimum luminosity is blank filaments.

Although clumps of the aforementioned cut multifilament initially remains solidified and retains the shape of clumps, during the course of transport and the like, it gradually splits apart and separates into single yarns. Moreover, clumps of staple fibers to having adhesive adhered thereto end up being surrounded by staple fibers not having adhesive adhered thereto resulting in the formation of aggregates (lumps). The formation of these lumps inhibit transport and mixing of the staple fibers as a result of the lumps being pushed away from those locations where the staple fibers are kneaded into and incorporated in the rubber, which not only cause fluctuations in the rate at which the staple fibers are incorporated in the rubber, but also ultimately cause cracks attributable to the clumps of staple fibers on the rubber surface following mixing and incorporation of the staple fibers. Moreover, if these lumps are mixed into rubber, the coefficient of friction is prevented from stabilizing during a load on the surfaces of staple fibers exposed by grinding the rubber, thereby leading to a significant increase in time-based fluctuations caused by non-adhesive staple fibers falling out. However, these detrimental effects can be avoided by having a low blank filaments ratio. The formation of lumps is inhibited if the ratio of the number of non-adhesive-treated fibers (blank filaments ratio) in the multifilament is 5% or less.

The amount of adhesive adhered to the staple fibers of the present embodiment is preferably 1% by weight to 5% by weight, more preferably 1.5% by weight to 4.5% by weight and even more preferably 2% by weight to 4% by weight. If the adhered amount of adhesive is 1% by weight or more, it contributes to uniform and favorable adhesion of the staple fibers to rubber, while if the adhered amount of adhesive is 5% by weight or less, it contributes to the short fibers being separated and dispersed as single fiber in the rubber without forming lumps caused by solidification of staple fibers by adhesive.

When applying adhesive in two or more stages, it is necessary to use caution to ensure that adhesive of the first stage does not end up obstructing permeation of the adhesive of subsequent stages. In addition, the application of an excessive amount of adhesive throughout the previous stage or subsequent stage in order to compensate for this should be avoided.

The single filament fineness of the staple fibers of the present embodiment is preferably 1 dtex to 8 dtex and more preferably 2 dtex to 6.5 dtex. If single filament fineness is 1 dtex or more, it contributes to favorable dispersibility in rubber due to the rigidity of the staple fibers, while if the single filament fineness is 8 dtex or less, it becomes difficult to inhibit flexibility of the rubber.

Single filament per se of the staple fibers preferably have a circular cross-section. If the shape of the single filament cross-section is circular, single filament oriented at a right angle to the sliding surface of the belt are inhibited from undergoing fluctuations in coefficient of friction caused by deformation of the single filament per se in that cross-section. The shape of the single filament cross-section is preferably such that oblateness, which is composed of the ratio of the major axis (longest interval) of an external bounded rectangle to the minor axis (shortest interval) thereof, is 1.00 to 1.05.

The fiber length of the staple fibers of the present embodiment is preferably 0.5 mm to 8 mm, more preferably 0.5 mm to 5 mm, even more preferably 1 mm to 5 mm, and still more preferably 1 mm to 4 mm. If the cut length of the staple fibers is 8 mm or less, there is no entanglement of fibers, favorable orientation is rubber is not difficult, and flexibility of a power transmission belt is not impaired. On the other hand, if the fiber length is 0.5 mm or more, the effect of reinforcing rubber friction transmission portions of a power transmission belt becomes effective, and the risk of the fibers per se coming off a belt lateral surface when engaging with V-grooves of a pulley is eliminated.

The cut surface of the multifilament of the present embodiment is preferably such that oblateness, which is composed of the ratio of the major axis (longest interval) of an external bounded rectangle to the minor axis (shortest interval) thereof, is preferably 2.0 to 4.0 and more preferably 2.5 to 4.0. If oblateness is 2.0 or more, the multifilament is crushed flat and adhesive permeates to the central portion thereof. If oblateness is 4.0 or lower, the multifilament does not excessively separate into single fibers and become bulky during the course of handling prior to incorporation in rubber and rubber blendability is not impaired.

Although the cut surface of the multifilament of the present embodiment is a cross-section of the multifilament fibers used and consists of bundles of single fibers, the fineness of the cut surface of the multifilament is preferably from 400 dtex to 8,000 dtex. If the fineness is 400 dtex or more, cutting errors when cutting the short fiber caused by rigidity of the multifilament adhered with adhesive are prevented. If the fineness is 8,000 dtex or less, a suitable amount of adhesive is able to easily permeated to the center without having to use an excess amount of adhesive. Fineness is more preferably 6,000 dtex or less.

The staple fibers of the present embodiment can be manufactured by tire fabric multifilament yarn followed by subjecting to adhesive treatment and then cutting into staple fibers.

Figure 4:
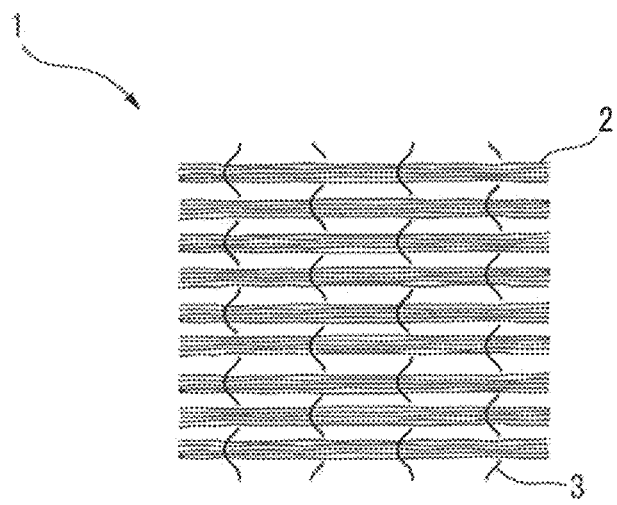
FIG. 4 is a schematic diagram of a tire fabric also referred to as sudare woven fabric).
Figure 5:
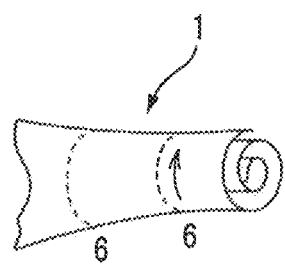
FIG. 5 is a schematic diagram of a bundle of a tire fabric prior to cutting into staple fibers.

FIG. 4 is a schematic diagram of a sudare weave used in the present invention. In addition, FIG. 5 is a schematic diagram showing a step for cutting a tire fabric into a bundle following adhesive treatment.

A sudare weave 1 used in the present embodiment has multifilaments of warp yarn arranged at prescribed intervals, and the cover factor of the warp yarn is preferably 150 to 2000. Here, warp yarn cover factor is defined as ($\sqrt{}$(warp yarn total fineness (dtex))×warp yarn density (yarns/cm)).

Figure 3:
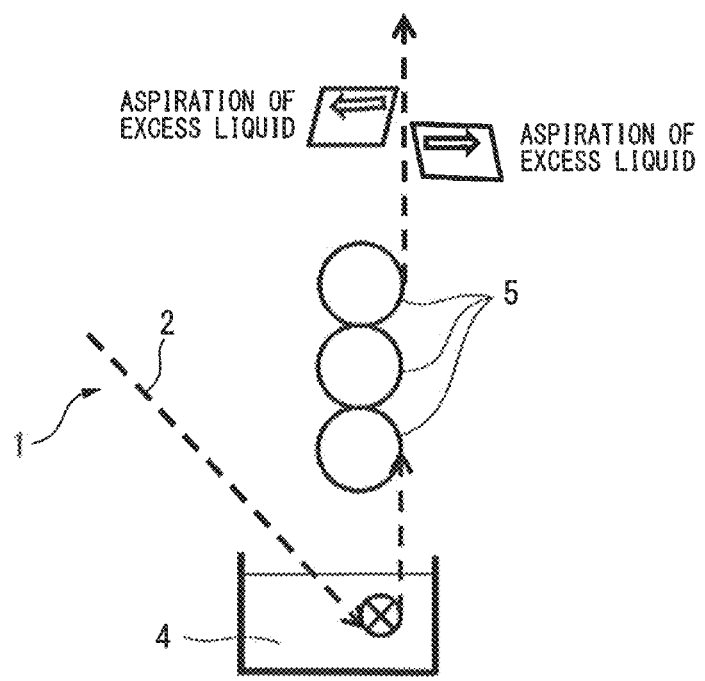
FIG. 3 is a schematic diagram of an adhesive treatment step in a method for manufacturing staple fibers according to the present invention.

As shown in FIG. 3, if the cover factor of the warp yarn is 2000 or less, the multifilament is effectively crushed when crushed with nip rolls after having been immersed in adhesive treatment solution, thereby enabling adhesive to adequately permeate into the central portion of the multifilament. The cover factor of the warp yarn is more preferably 1800 or less and even more preferably 1000 or less. If the cover factor of the warp yarn is 150 or more, snaking of the warp yarn is eliminated and the sudare weave can be handled stably, and the cover factor of the warp yarn is more preferably 500 or more. If the cover factor is sufficiently large, adhesive treatment and cutting processing can be carried out all at once, thereby making this economically advantageous.

Weft yarn 3, which serves as connecting yarn that stabilizes the alignment of the warp yarn 2, preferably has a density of 0.5 yarns/5 cm to 5 yarns/5 cm and more preferably 0.5 yarns/5 cm to 1.0 yarns/5 cm. If the weft yarn density is 5 yarns/5 cm or less, permeation of adhesive attributable to the weft yarn is not impaired by the weft yarn, while if the weft yarn density if 0.5 yarns/5 cm or more, warp yarn snaking of the sudare-woven fabric is prevented thereby allowing the fabric to be handled stably.

In addition, the weft yarn 3 can be removed by sorting out the weft yarn 3 in the form of a contaminant having a long fiber length after having cut the tire fabric 1 into staple fibers.

The weave structure of the tire fabric 1 is preferably n/1 and that in which the weft yarn bundles number of warp yarns is preferable. The value of n is preferably an integer of 1 to 3.

In addition, the warp yarn 2 is preferably obtained by first-twisting the multifilament 0 times/10 cm to 9 times/10 cm, gathering 2 to 4 of the warp yarns and then second-twisting 0 times/10 cm to 9 times/10 cm. If the number of twists is 9 twists/10 cm or less, the single fiber assembly of the multifilament is effectively crushed from a circular shape to a flat shape when interposed between nip rolls after having been immersed in adhesive treatment solution and adhesive is able to permeate to the central portion thereof, thereby contributing to uniform adhesion of adhesive to the single fibers. More preferably, the number of twists is 5 twists/10 cm or less. In the case of both first and second twisting, the warp yarn 2 is more preferably substantially free of twisting and only consists of unwinding twisting at less than 0.5 times/10 cm. Multifilament unwound and pulled out from a raw yarn package can be used directly or after aligning several yarns to obtain a tire fabric using substantially twist free warp yarn.

The tire fabric is treated with an adhesive in the form of a resorcinol-formaldehyde-latex (RFL) solution. The RFL solution is obtained by mixing an initial condensate consisting of resorcinol and formaldehyde with latex, and the molar ratio of resorcinol to formaldehyde in this case is 1:0.5 to 1:3. In addition, the initial condensate of resorcinol and formaldehyde is mixed with the latex so that the resin component thereof is 2 parts by weight to 30 parts by weight based on 100 parts by weight of the rubber component of the latex, followed by adjusting the total solid concentration to 5% by weight to 40% by weight. Examples of latex used here include chloroprene, styrene-butadiene-vinylpyrrolidone terpolymer, hydrogenated nitrile rubber, chlorosulfonated polyethylene, SBR, NBR and HNBR.

As shown in FIG. 3, in the present embodiment, the tire fabric is preferably interposed between upper and lower nip rolls 5 after leaving an RFL solution tank 4. The nip pressure for both the upper and lower nip rolls is preferably 1.2 MPa to 5.0 MPa. If the nip pressure is 1.2 MPa or higher, adhesive can be allowed permeate to the center of the multifilament cross-section as a result of crushing the multifilament and flattening the cut surface thereby enabling the single fibers to move out of position. On the other hand, if the nip pressure 5.0 MPa or lower, the tire fabric is able to travel stably. Nip roll treatment is known as a method for removing excessively adhered adhesive in tire cord adhesive processing. In particular, since properties such as fatigue resistance decrease if adhesive permeates to the center of the tire cord, nip roll treatment is used for the purpose of preventing adhesive permeation. The significance of the present embodiment lies in the fact that warp yarn which is the bunch the multifilaments are deformed to a flat shape so as to pressed warp yarn of the tire fabric, thereby allowing adhesive to permeate to the center of the multifilament yarn.

As shown in FIG. 3, the amount of adhesive adhered to the sudare-woven fabric can be controlled by aspirating excess liquid through vacuum ports provided in either the front or back or both of the nip rolls 5 and changing the vacuum pressure.

As shown in FIG. 5, the adhesive-treated sudare-woven fabric 1 is either wound along the direction of the weft yarn 3 (indicated by an arrow in the drawing), or formed into a bundle by repeatedly overlapping a plurality of sheets and then cutting with a cutter at a prescribed interval at cutting lines 6 in the direction of the weft thread 3 to produce staple fibers.

The aforementioned cut short fiber assembly is added to rubber such as chloroprene rubber, hydrogenated nitrile rubber, natural rubber, CSM, ACSM, SBR or EPCM in order to fabricate the rubber friction transmission portions of a power transmission belt. This addition is normally carried out by roll kneading or screw extrusion, and the staple fibers are uniformly dispersed in the rubber since there are no contaminants present in the staple fiber assembly. In addition, staple fibers can be arranged in a certain direction by a method such as roll extrusion.

Figure 6:
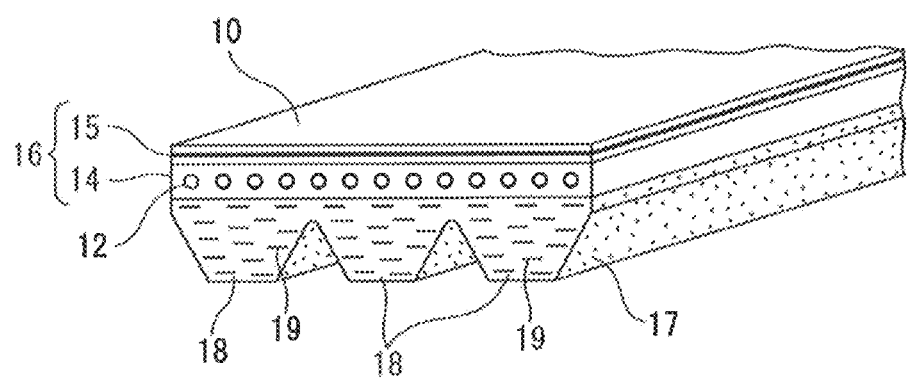
FIG. 6 is a cross-sectional perspective view of a V-ribbed belt that uses the staple fibers according to the present invention.

FIG. 6 is a cross-sectional perspective view of a V-ribbed belt using staple fibers. In the V-ribbed belt 10, core wires 12 composed of cords made of polyester, nylon or aramid fibers and the like embedded along the lengthwise direction of the belt in an adhesive rubber layer 11 composed, of chloroprene rubber, hydrogenated nitrile rubber, natural rubber, CSM, ACSM or SBR and the like to form a tension member layer 14 (adhesive rubber layer), and at least one layer of a rubber-provided canvas 15, obtained by weaving with cotton yarn or a blended yarn consisting of cotton and synthetic fibers, is laminated on the upper surface of the tension member layer 14 to form an extension layer 16.

On the other hand, a friction transmission portion 17 (compressed rubber layer) is formed on the lower surface of the tension member layer 14, and more specifically, is formed by a plurality of V-shaped ribs 18 extending in the lengthwise direction of the belt.

The staple fibers 19 according to the present embodiment are embedded in these ribs 13 while maintaining orientation in the widthwise direction of the belt. Namely, the cut short fibers are mixed in at 5 parts by weight to 25 parts by weight, and preferably 8 parts by weight to 15 parts by weight, based on 100 parts by weight of rubber. Furthermore, the staple fibers are preferably obtained by mixing with aramid fibers (such as polyparaphenylene terephthalamide). The mixing ratio of aramid fibers is preferably within the range of 15% by weight to 50% by weight, and the mixed staple fibers are preferably embedded and arranged in the widthwise direction of the belt.

The method used to grind the ribs 18 consists of rotating a grinding wheel embedded with diamonds at 80 mesh to 200 mesh on the surface thereof followed by contacting with a rotating vulcanized sleeve to form into the shape of ribs.

In addition, carbon black is also contained in the rubber composition of the friction transmission portion 17 at 30 parts by weight to 70 parts by weight based on 100 parts by weight of rubber to improve abrasion resistance and inhibit adhesion. In addition, the rubber composition also contains components such as a vulcanization accelerator, anti-aging agent or vulcanizing agent. There are no particular limitations on the method used to mix each of the aforementioned components, and for example, these components can be kneaded by a suitable known means or method using a Banbury mixer or kneader and the like.

The following provides a description of one example of a method used to manufacture the V-ribbed belt 10. First, one to a plurality of cover canvas sheets and cushioning rubber layers are wound onto the peripheral surface of a cylindrical forming drum, followed by spinning core wires composed of rope thereon in a spiral shape, sequentially winding on a rubber layer corresponding to the friction transmission portion and then vulcanizing to obtain a vulcanized sleeve. Next, the vulcanized sleeve is suspended between a drive roll and a driven roll and allowed to travel under prescribed tension, followed by further moving a rotating grinding wheel so as to contact the traveling vulcanized sleeve and simultaneously grind a plurality of 3 to 100 grooves in the surface of the compressed rubber layer of the vulcanized sleeve.

A rubber sheet containing the short fiber according to the present invention can be applied to a power transmission belt such as a V-ribbed belt, double V-ribbed belt or raw edge V belt.

EXAMPLES

The following provides a detailed explanation of the present invention through examples and the like thereof.
(Preparation of Staple Fibers)

A warp beam was prepared with a woven cord composed of synthetic fibers followed by weaving into a tire fabric. The tire fabric was immersed in the RFL solution indicated below and heated for 1 minute at 220° C. to obtain a dip (immersion)-treated woven fabric. This dip-treated woven fabric was then cut to obtain staple fibers.

RFL composition: A mixture of resorcinol, formaldehyde and latex was aged with sodium hydroxide to obtain a solution composition in which the solid weight ratio is such that RF/L=1/2.
(Preparation of Rubber Composition)

A rubber composition was prepared in accordance with the blend indicated below, and after kneading with a Banbury mixer, was rolled to a sheet thickness of 1.0 mm with a calender roll at a roll temperature of 30° C.
Rubber Composition (Parts by Weight):
 EPDM (ethylene/propylene/ethylidene norbornene): (100)
 Staple fibers (various fiber lengths): (30)
 Stearic acid: (1)
 Zinc oxide: (5)
 Carbon black: (50)
 Paraffinic oil: (10)
 Anti-aging agent: (2)
 Phenylene dimaleimide: (2)
 Organic peroxide (bis(t-butylperoxyisopropyl)benzene) 40/calcium carbonate: (8)
 Sulfur (0.3)
(Filaments Aggregation Number (Rubber Surface Clumps))

The rolled sheet was observed and the number of clumps resulting from the filaments aggregating without being dispersed in the rubber was determined.

The number of aggregated clumps on the surface of the rolled sheet over a range of 90 mm×90 mm was counted, and 5 or fewer clumps was evaluated as "A", 6 to 10 clumps was evaluated as "B", 11 to 100 clumps was evaluated as "C", and more than 100 clumps was evaluated as "D".
(Staple Fiber Dispersibility)

Overall dispersibility was evaluated by combining the content and orientation of staple fibers in the rolled sheet.

The rolled sheet was cut out to a width of about 2 cm in the widthwise direction of rolling followed by measurement of the dimension of width. Next, the sheet was immersed in toluene for 50 hours at normal temperature. The dimension of the swollen width was measured at the site where the dimension of width was previously measured, swelling multiple was evaluated, and variations in this swelling (standard deviation/mean) were used to evaluate staple fiber dispersibility. Swelling variation of 5% or less was evaluated as swelling variation of greater than 5% to 10% was evaluated as "B", swelling variation of greater than 10% to 30% was evaluated as "C", and swelling variation of greater than 30% was evaluated as "D".
(Bending Test (Crack Life))

Using a vulcanized rubber sheet for the sample, a De Mattia test was carried out in compliance with JIS K6260. Bending was repeated 1,000,000 times at a bending angle of 180° in an environment at 130° C. without making cuts in the sample, followed by evaluating bending crack formation durability according to the criteria indicated below.

"A": No formation of bending cracks and superior bending crack formation durability
 "B": Hardly any formation of bending cracks and superior bending crack formation durability
 "C": Definite crack formation observed
 "D": Definite crack formation and progression and inadequate bending crack formation durability
(V-Ribbed Belt Manufacturing Method)

In manufacturing a belt, after winding a 2-ply rubber-provided cotton canvas around a flat, cylindrical mold, an adhesive sheet composing the adhesive layer was wrapped thereon and core wires were arranged therein. After arranging the rolled rubber sheet that composes the compressed portions, a vulcanization jacket was placed over the adhesive rubber sheet. After placing this forming mold in a vulcanizer and subjecting to vulcanization, the cylindrical vulcanized sleeve was taken out of the forming mold, the compressed portions of the vulcanized sleeve were formed into ribs with a grinder, and the molded body was cut into individual belts to obtain a V-ribbed belt.
(Change in Belt Friction)

Measurement of the coefficient of friction of a V-ribbed belt was carried out by winding the V-ribbed belt around a guide roller (diameter: 60 mm) so that the winding angle of the V-ribbed belt was 90°, one end of the V-ribbed belt was immobilized, a 1.75 kgf/3 rib weight was suspended from the other end, tension T1 on the tight side and tension T2 on the relaxed side were detected by detecting the values of a load cell when the guide roller was rotated at 43 rpm, and the coefficient of friction $\mu=(1/2\pi)\ln(T1/T2)$ was measured from the tension ratio (T1/T2). After rotating for 2 hours, the change in the coefficient of friction between the initial value to that after the passage of time was evaluated, a rate of change of 15% or less was evaluated as "A", a rate of change of greater than 15% to 40% was evaluated as "B", a rate of change of greater than 40% to 100% was evaluated as "C", and a rate of change of greater than 100% was evaluated as "D".
(Change in Slip Ratio)

V-ribbed belts of size 3PK1100 were used for evaluation. Each V-ribbed belt was wound around a drive pulley (diameter: 120 mm) and a driven pulley (diameter: 120 mm) at room temperature and a weight was applied to the drive pulley so that the belt tension was 150 N/3 ribs. The belt was allowed to travel at a driven pulley rotating speed of 2000 rpm, and the load of the driven belt was increased from zero and set so that the belt demonstrated slippage of 2%. Slip ratio after 1 hour of driving was then again adjusted so a setting of a slippage of 2%. The belt was continued to be driven and the average value of the slip ratio after a total of 20 hours was measured and evaluated according to the criteria indicated below.
 "A": Slip ratio of 2.2 or less
 "B": Slip ratio of 3 to less than 2.2
 "C": Slip ratio of 4 to less than 3
(Fiber Birefringence)

Single filament were observed by immersing synthetic multifilament yarn in a liquid so that birefringence was roughly equal, birefringence was obtained from interference fringe generated with a Berek compensator using a polarizing microscope, and birefringence of the multifilament yarn was obtained from the average value of single filament birefringence.
(Non-Adhesive-Treated Filaments Ratio (Blank Filaments Ratio %))

A multifilament cross-section was observed with a light microscope using episcopic illumination, colored filaments in which RFL resin was present around the outside of filaments were distinguished from blank filaments not observed to be colored in which RFL resin was not present, and the ratio of the number of blank filaments to the total number of filaments (%) was taken to be the blank filaments ratio (%).

(Evaluation of Oblateness of Staple Fiber Multifilament Cross-Section)

A multifilament cross-section was observed with a light microscope using episcopic illumination, a search was made for the cut pieces of treated cord solidified with RFL resin in which the entire number of filaments was together, and the external form of treated cord cross-sections was observed. The ratio of the major axis (longest interval) of an external bounded rectangle to the minor axis (shortest interval) was taken to constitute oblateness.

(DPU Weight Percentage)

Using RFL-treated staple fibers for the sample, polyhexamethylene adipamide was dissolved with formic acid and the ratio of the weight of RFL resin obtained as residue was taken to be DPU (wt %). DPU (wt %)=RFL resin weight after dissolving/weight of RFL-treated staple fiber sample before dissolving×100.

Example 13

Polyhexamethylene adipamide fiber was used that had fineness of 2100 dtex, consisted of 350 filaments, had a draw ratio of 5.90 and birefringence of 0.0590. The shape of the single filament cross-sections was circular. Two of these fibers were pulled out in parallel without twisting to form a weaving cord, a warp beam was produced with the weaving cord and the cord was then woven into a tire fabric. The number of warp weaving cords at a weaving width of 155 cm was 1500 cords. The weft yarn was picked at 5 yarns/5 cm using 20 count cotton. The tire fabric structure was 1/1. The resulting tire fabric was immersed in the aforementioned RFL solution, pressed at a pressure of 2.7 MPa with nip rolls followed by controlling the amount of adhered RFL solution using a vacuum port (aspiration of excess liquid) and heating for 1 minute at 220° C. The amount of adhered RFL solution was 3.0%. A bundle of this treated fabric was cut at an interval length of 1 mm to obtain short fibers. The staple fibers were molded into a rubber composition sheet using the aforementioned rubber blend.

When a multifilament yarn cross-section of the staple fibers was observed, blank filaments was not observed and RFL was determined to have permeated to the center of the filaments bundle. In addition, the external form of the cross-section of the staple fibers had oblateness of 2.9 and had a crushed shape. Clumps of filaments were not observed on the surface of the molded rubber. Evaluation of cut fiber dispersibility in the molded product was favorable and did not demonstrate variations. There were little changes over time caused by abrasion of the molded belt and stability was favorable. There was little crack formation on the surface of the molded belt attributable to the passage of time. The various conditions and results of evaluations are collectively shown in the following Table 1.

Example 2

Example 2 was carried out in the same manner as Example 1 with the exception of pressing the tire fabric with nip rolls at a pressure of 2.3 MPa after immersing in RFL solution.

Example 3

Example 3 was carried out in the same manner as Example 1 with the exception of pressing the tire fabric with nip rolls at a pressure of 2.0 MPa after immersing in RFL solution.

Example 4

Example 4 was carried out in the same manner as Example 1 with the exception of pressing the tire fabric with nip rolls at a pressure of 1.6 MPa after immersing in RFL solution.

Example 5

Example 5 was carried out in the same manner as Example 1 with the exception of using polyhexamethylene adipamide fibers having fineness of 2100 dtex/700 fibers.

Example 6

Example 6 was carried out in the same manner as Example 1 with the exception of cutting the treated woven fabric to a length of 3 mm to obtain staple fibers.

Example 7

Example 7 was carried out in the same manner as Example 1 with the exception of twisting together two polyhexamethylene adipamide fibers at 3.5 twists/10 cm to obtain a woven cord.

Example 8

Example 8 was carried out in the same manner as Example 1 with the exception of twisting together two polyhexamethylene adipamide fibers at 6 twists/10 cm to obtain a woven cord.

Example 9

Example 9 was carried out in the same manner as Example 1 with the exception of using 2000 single fibers for the sudare weave at a weaving width of 155 cm.

Example 10

Example 10 was carried out in the same manner as Example 1 with the exception of cutting the bundle of treated woven fabric at an interval length of 6 mm to obtain staple fibers.

Dispersibility decreased somewhat and the effect of entanglement of single fibers was observed.

Example 11

Example 11 was carried out in the same manner as Example 1 with the exception of pulling out and aligning four untwisted polyhexamethylene adipamide fibers having fineness of 2100 dtex/350 fibers to obtain a woven cord.

It was difficult for adhesive to permeate the cord, white yarn was observed and dispersibility decreased somewhat.

Example 12

Example 12 was carried out in the same manner as Example 1 with the exception of immersing the tire fabric in the aforementioned RFL solution to impart a solid content of 3% followed by additionally immersing in the RFL solution in the same manner. The adhered amount of RFL solid was 7.5% by weight.

Crack life become somewhat worse and substances thought to be clumps of adhesive were present in the cracked portions.

Example 13

Example 13 was carried out in the same manner as Example 1 with the exception of using polyhexamethylene adipamide fibers having a draw ratio of 5.45 and birefringence of 0.0573.

The change in slip ratio increased somewhat.

Example 14

Example 14 was carried out in the same manner as Example 1 with the exception of using polyhexamethylene adipamide fibers having a draw ratio of 6.20 and birefringence of 0.0615.

Rubber dispersibility was favorable and changes in slip ratio following high-load driving were inhibited to an extremely low level.

Comparative Example 1

Comparative Example 1 was carried out in the same manner as Example 1 with the exception of twisting together two polyhexamethylene adipamide fibers at 36 twists/10 cm to obtain a woven cord.

Comparative Example 2

Comparative Example 2 was carried out in the same manner as Example 1 with the exception of pressing the tire fabric with nip rolls at a pressure of 1.0 MPa after immersing in RFL solution.

Comparative Example 3

Comparative Example 3 was carried out in the same manner as Example 1 with the exception of pressing the tire fabric with nip rolls at a pressure of 0.7 MPa after immersing in RFL solution.

Comparative Example 4

Comparative Example 4 was carried out in the same manner as Example 1 with the exception of twisting together two polyhexamethylene adipamide fibers at 10 twists/10 cm to obtain a woven cord and not using nip rolls.

Comparative Example 5

Comparative Example 5 was carried out in the same manner as Example 1 with the exception of not using nip rolls after immersing in RFL solution.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| White fiber ratio | % | 0 | 1 | 2.2 | 4.5 | 0 | 0 | 2.0 | 3.5 | 4.0 | 0 |
| Warp cover factor |  | 627 | 627 | 627 | 627 | 627 | 627 | 627 | 627 | 836 | 627 |
| DPO | wt % | 3 | 3 | 3 | 3 | 3 | 3 | 3 | 3 | 3 | 3 |
| Single filament | dtex | 6.5 | 6.5 | 6.5 | 6.5 | 3.5 | 6.5 | 6.5 | 6.5 | 6.5 | 6.5 |
| Single filament birefringence |  | 0.590 | 0.590 | 0.590 | 0.590 | 0.590 | 0.590 | 0.590 | 0.590 | 0.590 | 0.590 |
| Fiber length | mm | 1 | 1 | 1 | 1 | 1 | 3 | 1 | 1 | 1 | 6 |
| Cut oblateness |  | 2.9 | 2.5 | 2.3 | 2.0 | 3.1 | 2.9 | 3.4 | 3.7 | 2.9 | 2.9 |
| Nip pressure | MPa | 2.7 | 2.3 | 2.0 | 1.6 | 2.7 | 2.7 | 2.7 | 2.7 | 2.7 | 2.7 |
| Twisting | t/10 cm | 0 | 0 | 0 | 0 | 0 | 0 | 3.5 | 6 | 0 | 0 |
| Weft density | Yarns/5 cm | 5 | 5 | 5 | 5 | 5 | 5 | 5 | 5 | 5 | 5 |
| Rubber surface clumps |  | A | B | B | C | A | A | B | C | C | B |
| Dispersibility |  | A | B | B | C | A | A | B | C | C | C |
| Belt friction change |  | A | B | B | C | A | A | B | C | C | A |
| Crack life |  | A | B | B | C | A | A | B | C | C | B |
| Slip ratio change |  | B | B | B | B | B | B | B | B | B | B |

|  |  | Ex. 11 | Ex. 12 | Ex. 13 | Ex. 14 | Comp. Ex. 1 | Comp. Ex. 2 | Comp. Ex. 3 | Comp. Ex. 4 | Comp. Ex. 5 |
|---|---|---|---|---|---|---|---|---|---|---|
| White fiber ratio | % | 4.8 | 0 | 0 | 0 | 75 | 8 | 13 | 5.5 | 15 |
| Warp cover factor |  | 887 | 627 | 627 | 627 | 627 | 627 | 627 | 627 | 627 |
| DPO | wt % | 3 | 7 | 3 | 3 | 3 | 3 | 3 | 3 | 4 |
| Single filament | dtex | 6.5 | 6.5 | 6.5 | 6.5 | 6.5 | 6.5 | 6.5 | 6.5 | 6.5 |
| Single filament birefringence |  | 0.590 | 0.590 | 0.573 | 0.615 | 0.590 | 0.590 | 0.590 | 0.590 | 0.590 |
| Fiber length | mm | 1 | 1 | 1 | 1 | 1 | 1 | 1 | 1 | 1 |
| Cut oblateness |  | 2.1 | 2.9 | 2.9 | 2.9 | 1.3 | 1.6 | 1.4 | 1.6 | 1.2 |
| Nip pressure | MPa | 2.7 | 2.7 | 2.7 | 2.7 | 2.7 | 1.0 | 0.7 | None | None |
| Twisting | t/10 cm | 0 | 0 | 0 | 0 | 36 | 0 | 0 | 10 | 0 |
| Weft density | Yarns/5 cm | 5 | 5 | 5 | 5 | 5 | 5 | 5 | 5 | 5 |
| Rubber surface clumps |  | C | B | A | A | D | D | D | C | D |
| Dispersibility |  | C | B | A | A | D | D | D | D | D |
| Belt friction change |  | C | A | A | A | D | D | D | D | D |
| Crack life |  | C | C | A | A | D | D | D | C | D |
| Slip ratio change |  | B | B | C | A | D | D | D | C | D |

INDUSTRIAL APPLICABILITY

The staple fibers according to the present invention are preferable for use as a short rubber reinforcement fiber, the staple fibers can be preferably used in a power transmission belt in which the staple fibers are contained in rubber, and a power transmission belt can be provided that has superior durability and stable properties.

BRIEF DESCRIPTION OF THE REFERENCE SYMBOLS

1 Tire fabric
2 Warp yarn
3 Weft yarn.
4 Adhesive (RFL solution) solution
5 Nip rolls
6 Cutting lines
10 V-ribbed belt
12 Core wires
14 Tension member layer (adhesive rubber layer)
15 Rubber-provided canvas
16 Extension layer
17 Friction transmission portion (compressed rubber layer)
18 Ribs
19 Stable fibers

The invention claimed is:

1. Staple fibers, which are the product of cutting an adhesive-treated synthetic multifilament yarn, and are used by dispersing in a rubber composition; wherein, the ratio of the number of non-adhesive-treated single filaments is 0% to 50%, and oblateness of a cross-section of the synthetic multifilament yarn is 2.0 to 4.0.

2. The staple fibers according to claim 1, wherein the adhesive is adhered to the staple fibers at 1.0% by weight to 5.0% by weight.

3. The staple fibers according to claim 1, wherein the single filament fineness is 1 dtex to 8 dtex.

4. The staple fibers according to claim 1, wherein the length of the staple fibers is 0.5 mm to 8 mm.

5. The staple fibers according to claim 4, wherein the length of the staple fibers is 0.5 mm to 5 mm.

6. The staple fibers according to claim 1, wherein the fineness of a cross-section of the synthetic multifilament yarn is 400 dtex to 8,000 dtex.

7. The staple fibers according to claim 1, wherein the birefringence of the synthetic multifilament yarn is 0.050 or more.

8. A method for manufacturing the staple fibers according to claim 1, comprising the following steps:
a step for immersing a woven tire fabric, obtained by weaving a synthetic multifilament yarn in the manner of a tire fabric, in an adhesive treatment solution followed by pressing with nip rolls at a nip pressure of 1.2 MPa to 5.0 MPa, and
a step for cutting bundles of the resulting tire fabric to a prescribed length.

9. The method according to claim 8, wherein twisting of the synthetic multifilament yarn of the tire fabric is 9 twists/10 cm or less.

10. The method according to claim 8, wherein the cover factor of warp yarn of the tire fabric ((warp yarn total fineness (dtex))×warp yarn density (yarns/cm)) is 150 to 2000.

11. The method according to claim 10, wherein the cover factor of warp yarn of the tire fabric ((warp yarn total fineness (dtex))×warp yarn density (yarns/cm)) is 500 to 2000.

12. The method according to claim 8, wherein the weave structure of the tire fabric is n/1 wherein n is an integer of 1 to 3.

13. The method according to claim 8, wherein weft yarn density of the tire fabric is 0.5 yarns/5 cm to 5 yarns/5 cm.

14. A rubber composition containing the staple fibers manufactured according to the method according to claim 8.

15. A power transmission belt composed of the rubber composition according to claim 14.

16. A rubber composition containing the staple fibers according to claim 1.

17. A power transmission belt composed of the rubber composition according to claim 16.

* * * * *